Jan. 24, 1956 — M. R. DOCK — 2,731,791
CHAIN SHACKLE
Filed May 29, 1952 — 2 Sheets-Sheet 1
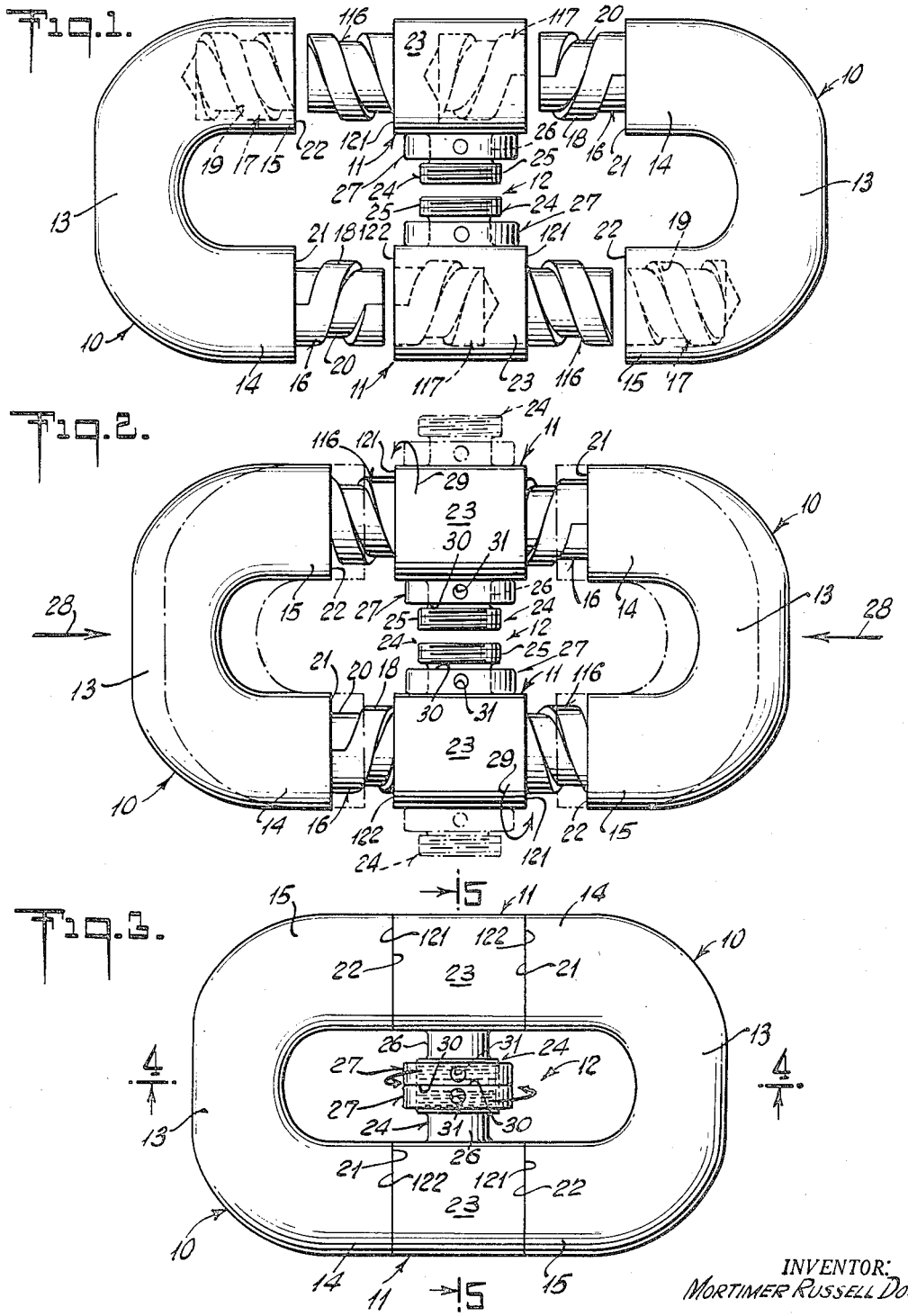
INVENTOR:
MORTIMER RUSSELL DOCK
BY
Watson Johnson Leavenworth & Blair
ATTORNEYS

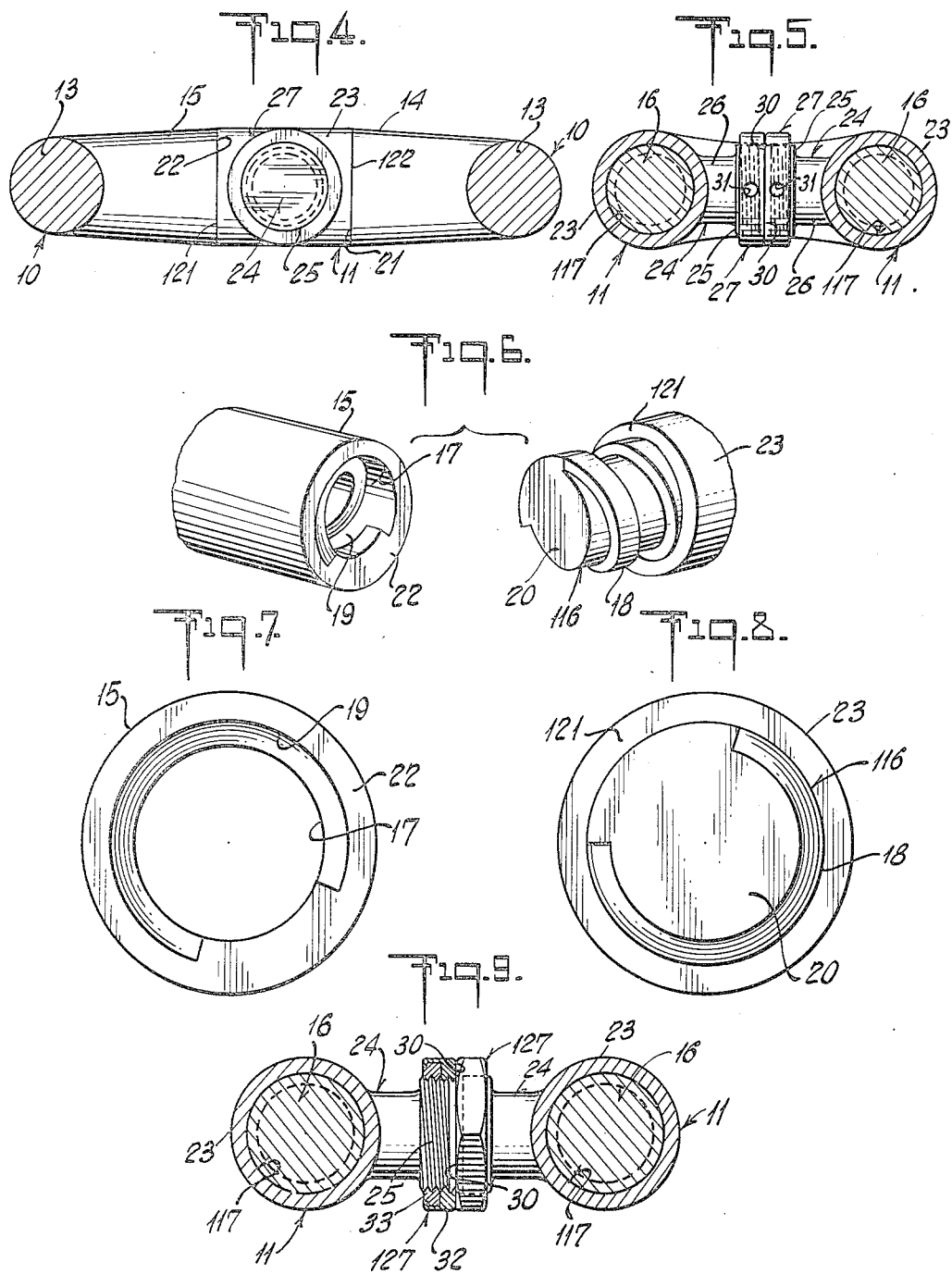

United States Patent Office 2,731,791
Patented Jan. 24, 1956

2,731,791
CHAIN SHACKLE

Mortimer Russell Dock, Washington, D. C.

Application May 29, 1952, Serial No. 290,739

9 Claims. (Cl. 59—86)

The present invention relates to chain shackles and, more particularly, to those of the stud link type, constituting an improvement of the subject matter of my copending U. S. patent application Serial No. 217,744, filed March 27, 1951; now Patent No. 2,621,471 of December 16, 1952.

A general object of the present invention is to provide such a chain shackle featured by a pair of opposed, substantially semi-elliptical end sections and a pair of opposed unique, stud lug-equipped side sections, the parts of which are readily and economically made in mass production, particularly since some are to be made as substantial duplicates. The elements are so constructed as to be simply mateable without error in a rapid manner without requiring any particular skill or familiarity with the construction, and the latter is thus especially useful under trying conditions in fields of combat, under water, in the dark, and the like. The parts of the preferred embodiment are so designed as to assure maximum strength with minimum likelihood in use of accidental disengagement of parts and damage thereto which might otherwise resist or prevent desired intentional disengagement for replacement of worn parts; the parts, however, being easily disassembled in an unusually simple manner for repair or replacement, or disconnection of chain sections.

A more specific object of the present invention is to equip at least some of such side link sections with stud lug structures automatically alignable when the threaded engagements of said end link sections with said side link sections are drawn up to intended substantial tightness and readily manipulated in a simple manner to be held together to prevent accidental disassembly of link parts.

A further object of the invention is to provide unique and simple means for holding the stud lugs together to form a rigid stud structure, parts of which may be rigidly abutted in substantial alignment effectively to prevent accidental misalignment thereof and relative loosening or disengagement of link parts and without requiring direct connection of the stud lugs, while allowing easy intentional disengagement of link parts.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is an exploded plan view of an embodiment of the stud link chain shackle of the present invention with the parts thereof shown in their relative laid-out positions preparatory to assembly;

Fig. 2 is a plan view of the structure shown in Fig. 1 and with parts shown in their initial relative positions as link parts are slid to contact preparatory to subsequent rotary engagement;

Fig. 3 is a top plan view of the structure shown in Figs. 1 and 2 indicating relative position of parts after they have been assembled to form a finished chain shackle;

Fig. 4 is a sectional view taken substantially on line 4—4 of Fig. 3;

Fig. 5 is a sectional view taken substantially on line 5—5 of Fig. 4;

Fig. 6 is a perspective view to an enlarged scale, with parts broken away, of threadedly engageable male and female link members constituting one of four pairs in the structure of Figs. 1 to 4, inclusive, but arranged obliquely with respect to each other before the necessary alignment for threadable interengagement so as best to illustrate structural features thereof;

Fig. 7 is an enlarged elevational end view of the female member shown in Fig. 6;

Fig. 8 is a view similar to Fig. 7 of the end of the male member of Fig. 6; and

Fig. 9 is a sectional view similar to Fig. 5, but to a larger scale, showing a modified form of abutment head collars with which the stud lugs are equipped.

Referring to the drawings, in which like numerals identify similar parts throughout, it will be seen that a preferred embodiment of the present invention may comprise a pair of opposed, substantially U-shaped or generally semi-elliptical end sections 10, 10 and a pair of interposed, laterally-spaced side sections 11, 11, with the latter equipped with parts of a transverse stud structure 12. The structural details of the various parts of that embodiment of the stud link chain shackle of the present invention are best seen in Fig. 1.

As shown in Fig. 1, each U-shaped end section 10 preferably is formed of round stock and comprises a mid-portion 13 having thickened end portions 14 and 15. End portion 14 carries a male member 16 and the other end portion 15 is provided with a female socket 17, with the axes of the male member and female socket being arranged substantially parallel to each other.

The male member 16 is suitably provided with a helical or spiralled thread 18 of any desired form, either right-handed or left-handed, and the female socket 17 is provided with an internal helical or spiralled thread 19. Although the single entry squared threads shown are preferred for purposes of strength and simplicity in manufacture multiple entry threads may, if desired, be used. For rapidity of assembly of parts each single entry thread preferably extends through about 360° so that about one turn only need be required in quick rotational assembly of parts. With respect to the selected hand for the male and female threads of an end section 10, those threads are opposite in hand. For example, if the male thread 18 is left-handed as shown, the female threads 19 is right-handed.

The spindle, shank or core 20 of male member 16 preferably is substantially cylindrical and at its base it connects with end portion 14 at a stop shoulder or circular abutment 21. End edge 22 of the end portion 15 circumambient of the mouth of female socket 17 also forms a stop shoulder or abutment, as will be more fully explained hereinafter.

Each side section 11 comprises a major portion 23 of cylindrical stock preferably of a diameter substantially that of the end portions 14 and 15. One end of the major portion 23 of either side section 11 is provided with an externally-threaded male member 116 like, in all respects, the male member 16 of each end section 10, except that the threads thereof are opposite in hand. Male member 116 has at its base a similar stop shoulder or abutment 121. In the other end of major portion 23 of side section 11 is provided an internally-threaded female socket 117 like, in all respects, female socket 17 of end section 10 except that the threads thereof are opposite in hand. The end edge 122 circumambient of the mouth of socket 117 also provides a stop shoulder or abutment similar to 22. It will thus be seen that the male members 16, 16 of end sections 10, 10, and male members 116, 116 of side sections 11, 11, respectively are mateable with female sockets 117, 117 of the side sections and the female sockets 17, 17 of the end sections, and together constitute interengageable means providing rotary connections between the end and side sections.

It will be noted from Figs. 1 and 2 that each side section 11 preferably has mounted to one side of major portion 23 a stud lug 24 extending normal thereto, and preferably made integral therewith. Each stud lug 24 preferably is of the threaded upset type having an enlarged, externally-threaded head 25 at its outer end connected to the side link section by a reduced unthreaded shank 26. An abutment head 27, preferably in the form of an internally-threaded sleeve or collar, is threadably engaged on each of the externally-threaded enlarged stud lug heads 25. Each collar 27 preferably is long enough substantially to cover the threads of head 25 to protect them from damage, while being of a length less than the neck 26 so as to hang loosely thereon when run back, as shown in Figs. 1, 2, 3 and 5. When run back on the shank 26 of the stud lug on which each collar 27 is mounted, the latter is securely retained on that side section 11 by its lug head 25 to be immediately available for use at all times. The action of such stud lug structure and the abutment collars thereof in holding the stud lugs securely in alignment will be explained hereinafter in a description of the assembly of the stud link shackle parts.

To assemble the parts of the stud link chain shackle of the embodiment of Figs. 1, 2 and 3, a pair of the substantially U-shaped end sections 10, 10 are laid out, preferably on a flat surface, in laterally-spaced relation with the male member 16 of one opposed to the female socket 17 of the other in approximate alignment. A pair of side link sections 11, 11 are then interposed between each pair of opposed male member 16 and female socket 17 with the enlarged stud lug heads 25, 25 arranged opposite each other in substantial alignment, all as illustrated in Fig. 1. In so interposing side link sections 11, 11, of course, the female socket 117 of each is opposed to the male member 16 of the end link section 10, and the male member 116 of each side link section is opposed to the female socket 17 of the other end link section, as one naturally would assume.

The opposed end sections 10, 10 are then pushed toward each other to engage all of the male members 16, 16 and 116, 116 respectively into the famale sockets 117, 117 and 17, 17, as is graphically illustrated in Fig. 2. Such push on the end sections 10, 10 in the directions of the arrows 28, 28 will cause the threads 18 of the male members to lead into the threads 19 of the female members with attendant rotation of the side sections 11, 11 in opposite directions, as is indicated by the arrows 29, 29. Thus, as indicated in Fig. 2 in dot-dash lines, with the male members 16, 16 of the end sections 10, 10 being provided with left-handed threads mateable in the threads of female sockets 117, 117 of the side sections 11, 11, and with the male members 116, 116 of the latter provided with right-handed threads mateable in the threads of female sockets 17, 17 of the end sections, the side sections will rotate in opposite directions. For example, the upper side section 11 as viewed in Fig. 2 will rotate clockwise, and the lower side section will rotate counter-clockwise as arrows 29, 29 indicate. As a result, when the end sections 10, 10 are pushed to the dot-dash line positions, the stud lugs 24, 24 will turn through about 180° to the outer sides, as indicated in dot-dash lines in Fig. 2. The appreciable spacing of the stud lug heads 25, 25 is necessary to permit them to be rotated out away from each other.

With further push on the end sections 10, 10, the parts will be thrust home, with the male threads fully pushed up into the female threads and with the link sections abutment shoulders and edges 22 and 121, and 21 and 122 respectively brought to snug engagement, as shown in Fig. 3. This will rotate the stud lugs 24, 24 through another 180° back substantially to their original positions in substantial alignment, as indicated in Fig. 3, and with their externally-threaded, enlarged heads 25, 25 opposed in spaced relation. The appreciable spacing of stud lug heads 25, 25 permits that second half turn of the stud lugs in toward each other to substantial alignment.

The abutment collars 27, 27 loosely held on lug shanks 26, 26 then easily may be threaded outwardly upon the threaded heads 25, 25 so that the outer sides or faces 30, 30 of the collars are brought into snug face engagement, as is indicated in Fig. 3. When such collars 27, 27 are equipped with holes 31—31, pin or yoke wrenches may be engaged on the collars easily to thread them outwardly to tight engagement of the outer sides 30, 30 in snug abutting relation. As a result, with the stud lug collars 27, 27 brought to tight engagement of each other, rotation of stud lugs 24, 24 in reverse directions will be effectively prevented so that thus the shackle parts are securely held together. Such abutting engagement of the end portions of the stud lug structures thus makes unnecessary direct connection of the stud lugs, by thread engagement or otherwise, to hold them in secure alignment. Substantial coverage of the male threads of the enlarged stud lug heads 25, 25 protects them from damage by handling equipment such as wildcats, and by contact with other chain links during handling or storage in chain lockers.

Intentional disassembly of shackle parts is readily permitted by backing off the abutted stud lug collars 27, 27 so as to space the opposed stud lug structures permitting them to be rotated past each other in the directions reverse from those featuring assembly of the shackle parts; and thus sections of chain may be readily disconnected or worn parts of shackles may be easily replaced. Further, such shackles can be produced economically on a mass production basis at a price which will even permit quick hand assembly of whole sections of anchor chains formed only of such shackle links.

As is best seen in Figs. 6, 7 and 8, a tip portion of each male thread 18 preferably is omitted or cut away, and similarly a portion of each female thread 19 at the entrance end of the female sockets 17 and 117 preferably is omitted or removed. This facilitates initial interengagement of the male members 16, 116 into the female sockets 117, 17 when the end sections 10, 10 are pushed toward each other, as indicated in Fig. 2. Furthermore, such omission or removal of the entrance end portions of the male and female threads properly indexes one relative to the other so that the male threads may be readily run into the threads of the female sockets by opposite rotation of the side sections 11, 11 when the end sections 10, 10 are pushed toward each other. By making each thread extend through only one complete turn, the pitch thereof is such that the side sections 11, 11 will rotate easily and automatically as the end sections 10, 10 are pushed toward each other without necessitating direct application of any rotational force to the side sections. Also, the parts of the shackle will be quickly drawn together on thrust home in a minimum time with only one complete rotation of each of the side sections 11.

As proposed in Fig. 9, modified forms of the abutment collars constituting parts of the stud lug structures may be used to advantage. As therein indicated, each collar 127 may be of the lock nut type, each comprising a main body 32 recessed on one face, preferably the rear as shown, to receive and carry a locking insert 33 of the distortable fiber or warped steel ring type. As a result, when the abutment collars 127, 127 are run out on the threads 25, 25 of the opposed stud lugs 24, 24 to bring their opposed outer faces 30, 30 into engagement so as to hold the stud lugs in secure alignment, the locking inserts 33, 33 will assure that the abutment collars will be held securely in abutted engagement to avoid any tendency for such accidental backing off as might permit the parts of the shackle to be loosened or disengaged. Also, as shown in Fig. 9, such abutment collars 127, 127 may be of the hexagonal type having flatted faces for engagement by ordinary wrenches or spanners so as to permit easy tightening of the collars against each other. Other equivalent stud lug abutting means will readily occur to one skilled in the art, such as end caps and other types of extensible stud lug constructions. Also, the present invention may be incorporated in a structure wherein only one stud lug means is provided with extensible elements to be moved out to end abutment of the other stud lug means to retain them in alignment. For example, a cap may be threaded on the end of one stud lug to be run out to abutting engagement of the opposed end of the other stud lug.

It will thus be seen that stud lug structures of the present invention eliminate the necessity of using any means for directly connecting the stud lugs together to hold them in substantial alignment for securing the shackle parts together. No problems of threading a member off of one onto an opposed spaced threaded member, which can require careful alignment for initial thread engagement and demand in commercial production avoidance of wide tolerances in dimensions and shapes, exist. The stud lug abutting means of the present invention readily accommodates the opposed parts to each other even though there be wide variations in dimensions and relative positions of parts. It will be further noted that such shackle structure permits the use of a minimum of parts, each being duplicated in the shackle structure. The end sections 10, 10 are duplicates. The side sections 11, 11 are duplicates; and the abutment collars 27, 27 or 127, 127 may be duplicates. The shackle link parts are of surprisingly simple construction readily produced on a mass production basis and permit in an astonishingly simple manner the assembly of the parts into secure, strong and efficient chain shackles. It will also be understood that if longer shackle links are desired, additional mating side sections inserts or extenders may be employed, either as substantial duplicates of the side sections 11, 11 or modifications thereof which omit stud lug structures. However, at least one opposed pair of the side link sections should be equipped with stud lug structure of the present invention. Each unitary extender employs external and internal threads of the same hand, but opposed extenders on directly opposite sides of the link use threads of the opposite hand. For example, if a single extender on one side of a link has left-handed external and internal threads, the extender on the directly opposite side of the link will have right-handed external and internal threads.

It will thus be seen that the objects set forth above, among those made apparent from the preceding description are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by letters patent is:

1. A chain shackle comprising, in combination; a plurality of connected sections held by each other substantially rigid relative to each other and including a pair of opposed U-shaped end sections and pair of laterally-spaced intervening side sections, at least one of said side sections being rotatable about its axis relative to said end sections with at least one of the latter and this side section having interengageable means connectably engageable upon such axial rotation of this side section in one direction and disconnectably disengageable upon reverse axial rotation of the latter; and a plurality of cooperating stud lug means with one thereof mounted on and carried by each of said side sections, the stud lug means on said rotatable side section being rotatable therewith to opposed, spaced-apart and substantially aligned relation with respect to the stud lug means on the other side section upon connected assembly of said sections; said stud lug means including cooperating abutment means with at least one of said stud lug means being extensible toward the opposed stud lug means to move the abutment means of the former to abutting engagement of the latter securely to hold said stud lug means substantially in alignment without necessitating direct connection thereof to prevent rotation of the rotatable side section and thus temporarily to lock the assembled sections together, the abutment means of said extensible stud lug means being readily movable by shortening of the latter away from abutting engagement of the other abutment means to permit rotation of said rotatable side section for disconnectable disengagement of the latter from the end section which carries therewith the interengageable means.

2. The chain shackle as defined in claim 1 characterized by the provision of said extensible stud lug means and its abutment means in the form of a rotatable threaded member threadably mounted on a relatively fixed portion of that stud lug means to be run out upon its rotation to form an extension abuttable of the abutment means of the other stud lug means.

3. The chain shackle as defined in claim 2 characterized by the provision of both of said stud lug means with their abutment means in the form of opposed, relatively fixed stud lug portions and a pair of said threaded abutment members with each of the latter threadably mounted on one of said relatively fixed portions whereby said abutment members are abutted together.

4. In a sectioned chain shackle of the cross stud type a pair of opposed U-shaped end sections and a pair of laterally-spaced intervening side sections threadably mounted rigidly together, said side sections being adapted to be rotated, relative to said end sections threadably to disconnect the shackle sections from each other, a pair of stud lugs each mounted upon and extending from one side of each of said side sections to be disposed in spaced-apart, substantially aligned relation when said shackle sections are threadably tightened home in connected relation, and a pair of threaded abutment members with one threadably mounted on the outer end of each of said stud lugs to be run out to abutting engagement of each other upon substantial alignment of said stud lugs temporarily to hold said stud lugs in such alignment with said shackle sections thereby locked in assembled positions, said abutment members being threadably retractable to permit relative rotation of said stud lugs and attendant disassembly of said shackle sections.

5. In a sectioned chain shackle of the cross stud type characterized by opposed end sections and laterally-spaced side sections demountably connected together by threaded connections with the side sections held rigidly relative to each other and being threadably demountable from said end sections by rotation; a pair of opposed spaced stud lugs mounted on said side sections and having threaded outer ends, and a pair of threaded abutment members mounted on the threaded outer ends of said lugs to be abutted upon rotation to opposite certain directions to hold said stud lugs in substantial alignment, for preventing relative rotation of said side sections, said abutment members being threadably retractable upon rotation in opposite reverse directions to free said stud lugs from each other and to permit demountable rotation of said side sections.

6. The stud lug structure as defined in claim 5 characterized by the provision of said abutment members as internally-threaded collars having substantially flat outer faces to be brought to abutment of each other upon relative axial rotation in opposite directions.

7. The stud lug structure as defined in claim 6 characterized by the provision of said stud lugs as having threaded upset heads on their outer ends each of a length appreciably less than the length of the collar to be threaded thereon whereby when said collars are axially rotated to abutment of each other said lug threads are protectively covered.

8. A chain shackle of the stud link type comprising, in combination; a pair of substantially like U-shaped end sections each having an internally-threaded socket in one end thereof and an externally-threaded male member extending from the other end thereof substantially parallel to said socket, with the male threads like and the female threads being like but opposite in hand to the male threads; a pair of substantially like side link sections each having a male member extending from one end thereof carrying a male thread mating with the female thread of one of said sockets and threadably engaged therein, and a socket in the other end of each of said side link sections having a female thread mating with the male thread of one of said end section male members and threadably receiving the latter with said side link sections held rigidly relative to each other by said end sections; a pair of opposed stud lugs each extending from one side of each of said side sections toward the other side section with the outer ends of said lugs spaced apart appreciably when in substantial alignment to permit passage upon rotation of said side sections, said outer ends being upset and externally threaded; and a pair of abutment collars threadably engaged on said upset lug ends with their outer sides extending beyond the lug outer ends to abutment of each other temporarily to hold said lugs in substantial alignment with said sections locked in relative assembled positions.

9. A chain link shackle comprising, in combination, a plurality of connectable sections cooperatively to form a stud link and including a pair of opposed U-shaped end sections and a pair of laterally-spaced side sections, interengageable means providing rotary connections between said end and side sections with said side sections being held substantially rigid relative to each other and with each of said side sections being rotatable in one direction to effect connection of said link sections and rotatable in the opposite direction to effect disassembly of the link sections, a pair of stud lugs each mounted on one side of one of said side sections and extending generally normal thereto to be in substantially aligned opposed relation with their opposed outer ends spaced apart appreciably when the link sections are fully connected together, and a pair of abuttable extensions each movably mounted on the outer end of one of said stud lugs, each of said extensions having an outer transversely extending abutment end with said abutment ends being adapted to abut each other to bridge the space between the outer ends of said stud lugs and prevent the latter and the side sections which carry the latter from rotating to avoid rotary disassembly of the side sections relative to the end sections when said stud lugs and abuttable extensions are substantially aligned with said abutment ends in abutting relation, said abuttable extensions being readily movable at will without requiring alteration or destruction to free their abutment ends from abutting contact to permit rotation of said stud lugs for rotary disassembly of said side sections relative to said end sections while being readily returnable to abutted relation for locking the reassembled shackle sections together.

References Cited in the file of this patent

UNITED STATES PATENTS

| 1,394,634 | Luschka et al. | Oct. 25, 1921 |
| 1,734,215 | Kinard | Nov. 5, 1929 |

FOREIGN PATENTS

| 5,598 | Norway | Dec. 10, 1896 |
| 620,330 | Great Britain | Mar. 23, 1949 |